(12) United States Patent
Momchilov et al.

(10) Patent No.: US 12,126,723 B2
(45) Date of Patent: Oct. 22, 2024

(54) COMPUTING SYSTEM AND RELATED METHODS PROVIDING MULTIPLE ENDPOINT CONNECTIONS BASED UPON CONNECTION LEASES

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US)

(*) Notice: Subject to any disclaimer, the term of this patent is extended or adjusted under 35 U.S.C. 154(b) by 452 days.

(21) Appl. No.: 17/448,218

(22) Filed: Sep. 21, 2021

(65) Prior Publication Data

US 2022/0345311 A1  Oct. 27, 2022

Related U.S. Application Data

(60) Provisional application No. 63/178,762, filed on Apr. 23, 2021.

(51) Int. Cl.
*H04L 9/32* (2006.01)
*G06F 8/65* (2018.01)
*G06F 9/451* (2018.01)
*H04L 9/30* (2006.01)
*H04L 9/40* (2022.01)

(52) U.S. Cl.
CPC .............. *H04L 9/3215* (2013.01); *G06F 8/65* (2013.01); *G06F 9/452* (2018.02); *H04L 9/30* (2013.01); *H04L 63/029* (2013.01)

(58) Field of Classification Search
CPC ....... H04L 9/3215; H04L 9/30; H04L 63/029; H04L 63/0272; H04L 63/0807; H04L 9/0897; H04L 63/0823; H04L 9/0891; G06F 8/65; G06F 9/452
See application file for complete search history.

(56) References Cited

U.S. PATENT DOCUMENTS

| | | |
|---|---|---|
| 8,014,421 B2 | 9/2011 | Rao et al. |
| 8,132,247 B2 | 3/2012 | Adhya et al. |
| 8,301,686 B1 | 10/2012 | Appajodu et al. |
| 9,009,327 B2 | 4/2015 | Adhya et al. |
| 9,286,281 B2 | 3/2016 | Dunn et al. |
| 9,426,227 B2* | 8/2016 | Bell ..................... H04L 67/131 |
| 9,690,954 B2 | 6/2017 | Nord et al. |
| 9,805,210 B2 | 10/2017 | Nord et al. |
| 10,778,591 B2 | 9/2020 | Ramaiah et al. |
| 2016/0094546 A1 | 3/2016 | Innes et al. |

(Continued)

*Primary Examiner* — Han Yang

(57) ABSTRACT

A computing appliance may include a memory and a processor configured to cooperate with the memory to establish a first virtual session for an endpoint device over a first network connection. The endpoint device may have an endpoint public/private key pair associated therewith and configured to store a plurality of connection leases generated based upon the endpoint public key, and the first virtual session may be established responsive to a first one of the connection leases and authentication based upon the endpoint private key. The processor may further establish a second virtual session for the endpoint device to access through the first virtual session with another computing appliance over a second network connection responsive to a second one of the connection leases and authentication based upon the endpoint private key.

20 Claims, 14 Drawing Sheets

(56) References Cited

U.S. PATENT DOCUMENTS

| | | |
|---|---|---|
| 2019/0297149 A1 | 9/2019 | Seed et al. |
| 2020/0218559 A1* | 7/2020 | Singleton, IV ......... H04L 67/14 |
| 2020/0371829 A1* | 11/2020 | Momchilov ............ G06F 9/452 |
| 2020/0374121 A1* | 11/2020 | Momchilov ........... H04L 9/0825 |
| 2020/0374136 A1* | 11/2020 | Momchilov .......... H04L 9/0819 |
| 2020/0374154 A1* | 11/2020 | Momchilov ........ H04L 12/4633 |

\* cited by examiner

COMPUTING SYSTEM AND RELATED METHODS PROVIDING MULTIPLE ENDPOINT CONNECTIONS BASED UPON CONNECTION LEASES

RELATED APPLICATIONS

This application claims the benefit of provisional application Ser. No. 63/178,762 filed Apr. 23, 2021, which is hereby incorporated herein in its entirety by reference.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. Virtual Desktop Infrastructure (VDI) refers to the process of running a user desktop and/or application inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A computing appliance may include a memory and a processor configured to cooperate with the memory to establish a first virtual session for an endpoint device over a first network connection. The endpoint device may have an endpoint public/private key pair associated therewith and configured to store a plurality of connection leases generated based upon the endpoint public key, and the first virtual session may be established responsive to a first one of the connection leases and authentication based upon the endpoint private key. The processor may further establish a second virtual session for the endpoint device to access through the first virtual session with another computing appliance over a second network connection responsive to a second one of the connection leases and authentication based upon the endpoint private key.

In an example embodiment, the processor may be further configured to establish a secure tunnel with the endpoint device via the first network connection, and authenticate the second connection lease based upon the endpoint private key via the secure tunnel. In accordance with one example, the processor may authenticate the second connection lease by accessing the endpoint private key via a virtual channel over the secure tunnel. In accordance with another example, the processor may authenticate the second connection lease by accessing the endpoint private key via a virtual smart card over the secure tunnel.

The processor may further be configured to perform background downloads of updates to the connection leases from a local file share in some embodiments. Furthermore, the processor may be configured to store the updates to the connection leases in a memory and at the endpoint device, for example.

In an example embodiment, the processor may be further configured receive a published resource identifier (ID) from the endpoint device corresponding to a virtual desktop being accessed by the endpoint device, and block launching of the virtual desktop associated with the published resource ID. The processor may further be configured to cache the connection leases and endpoint public key in the memory in some embodiments. The processor may also be configured to establish the first and second virtual sessions based upon a user interface (UI) cache associated with the endpoint device, for example.

A related method may include establishing, at a computing device, a first virtual session for an endpoint device over a first network connection. The endpoint device may have an endpoint public/private key pair associated therewith and be configured to store a plurality of connection leases generated based upon the endpoint public key, and the first virtual session may be established responsive to a first one of the connection leases and authentication based upon the endpoint private key. The method may further include establishing, at the computing device, a second virtual session for the endpoint device to access through the first virtual session with another computing appliance over a second network connection responsive to a second one of the connection leases and authentication based upon the endpoint private key.

A related non-transitory computer-readable medium may have computer executable instructions for causing a computing device to perform steps including establishing a first virtual session for an endpoint device over a first network connection. The endpoint device may have an endpoint public/private key pair associated therewith and be configured to store a plurality of connection leases generated based upon the endpoint public key. The first virtual session may be established responsive to a first one of the connection leases and authentication based upon the endpoint private key. A further step may include establishing a second virtual session for the endpoint device to access through the first virtual session with another computing appliance over a second network connection responsive to a second one of the connection leases and authentication based upon the endpoint private key.

DETAILED DESCRIPTION

One approach to connecting user computing devices to virtual sessions involves connection leases (CLs), which provide long-lived and mostly static entitlements to published resources the users are entitled to access. Connection leases are relatively long-lived in that they can be updated on a less frequent basis (e.g., to account for changes in user permissions, network addresses, etc.). Resiliency may further be provided through the use of Progressive Web App (PWA) Service Worker caching, which allows for web-based user interfaces (UIs) to be functional even in offline or degraded network conditions. However, both CLs and PWA-cached resources are typically user and device specific by design, in that their lifetime is aligned with a user logging in/logging out on a specific device. In this way, the connection leases are bound to the specific device in that they are generated by a connection lease issuing service based upon a public key associated with the device, and therefore need to be authenticated by the corresponding private key stored securely on the endpoint device.

While important for securing, this configuration makes connection leasing difficult in multi-level connection or "hop" virtualization scenarios, which are common in virtualized computing implementations. For example, a user at an endpoint may initially connect to a virtual desktop, and then within the virtual desktop launch additional published apps and/or desktops. Thus, there are multiple connections or hops from the endpoint device to the virtual desktop, and from the virtual desktop to the additional published apps/desktops.

The approach set forth herein helps overcome these technical challenges by binding second and higher-level connection leases and long-lived authentication tokens to an endpoint device using the endpoint's private/public key pair. Computing devices which initiate the second or higher-level connections may operate in a pass-through mode using the endpoint's private/public key pair, that is, for passing through CL (or other) authentication requests from second or higher level connections to the endpoint device for authentication using the endpoint private key. Access to the endpoint's private/public key pair from downstream computing devices may be achieved by either extending a connection lease exchange protocol over a control virtual channel, or through the use of a virtual smart card, for example. As such, the second and higher-level CLs may be authenticated, yet private key security is not compromised because the private key never has to leave the endpoint device.

Figure 1:
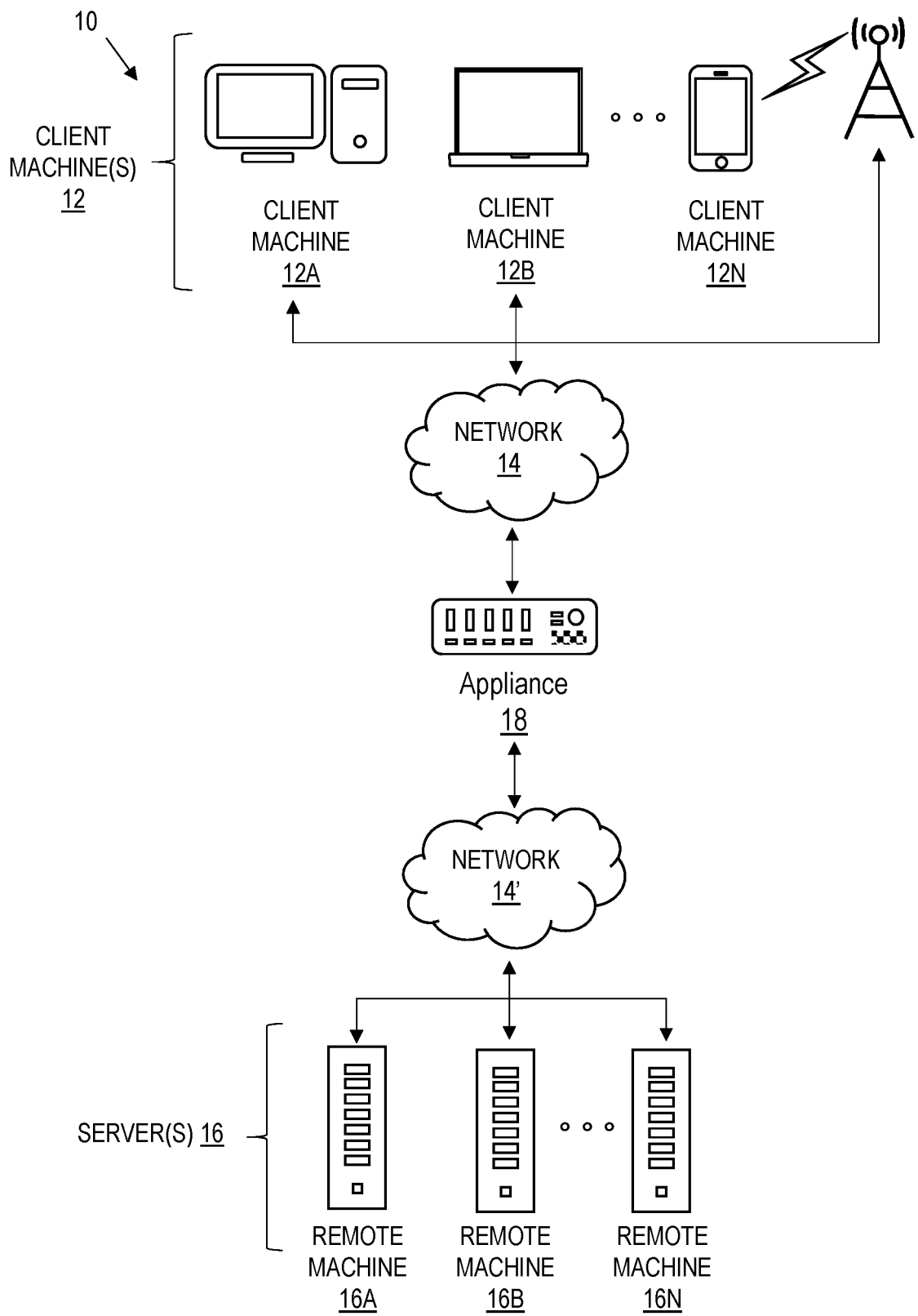
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14;

and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
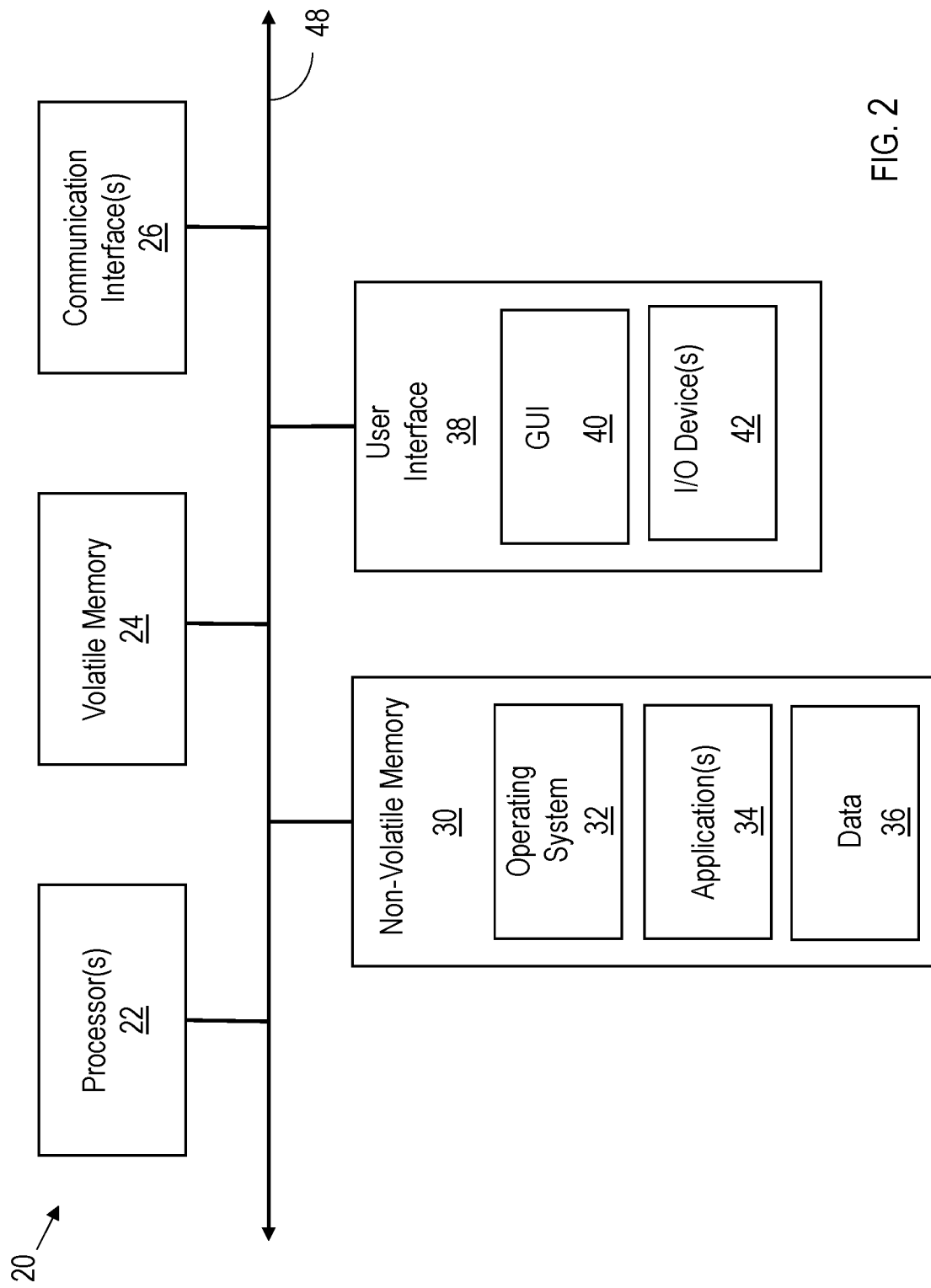
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
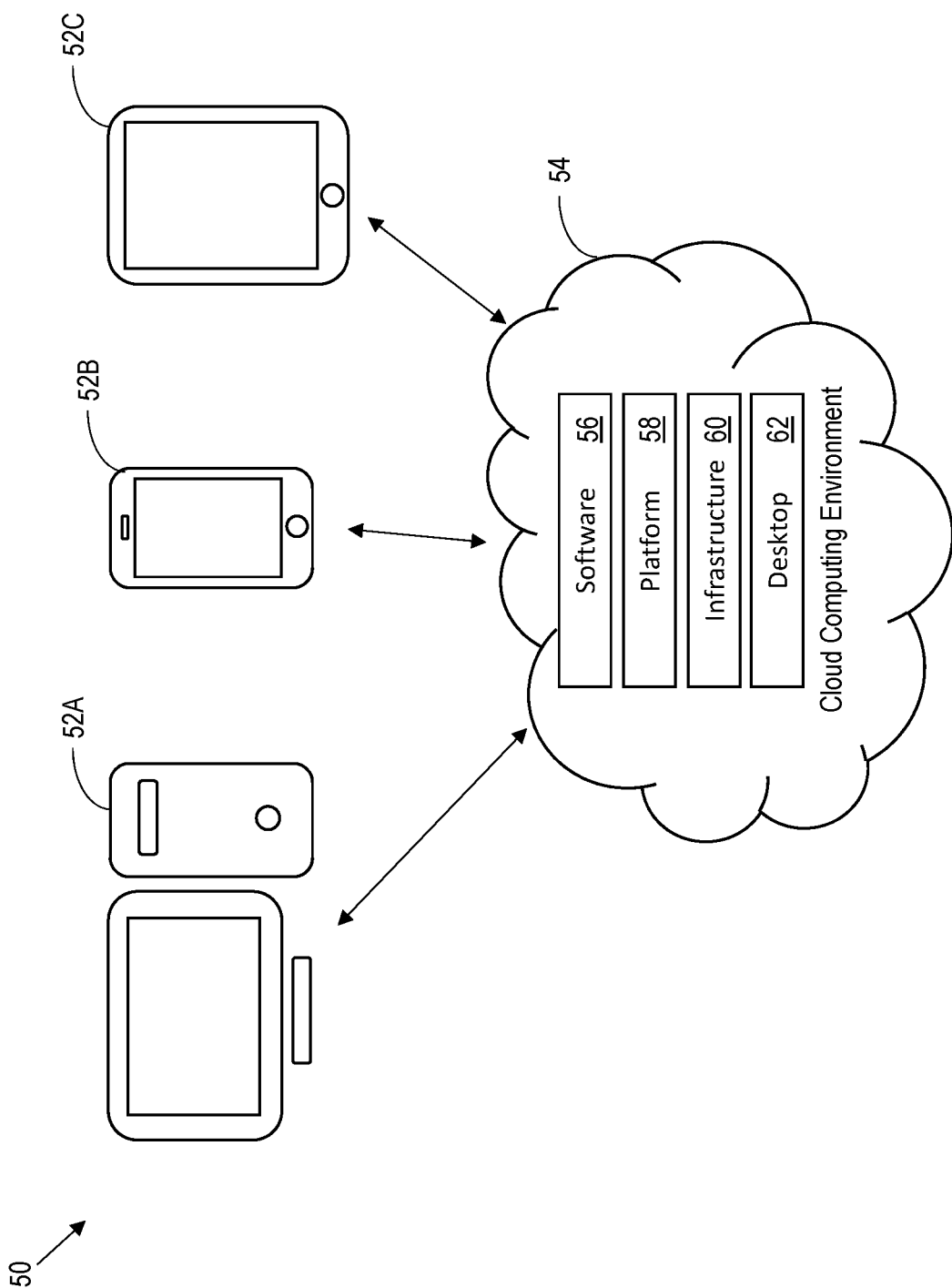
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKY-DRIVE provided by Microsoft Corporation, Google Drive provided by Google Inc., or Apple ICLOUD provided by Apple Inc. of Cupertino, California Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
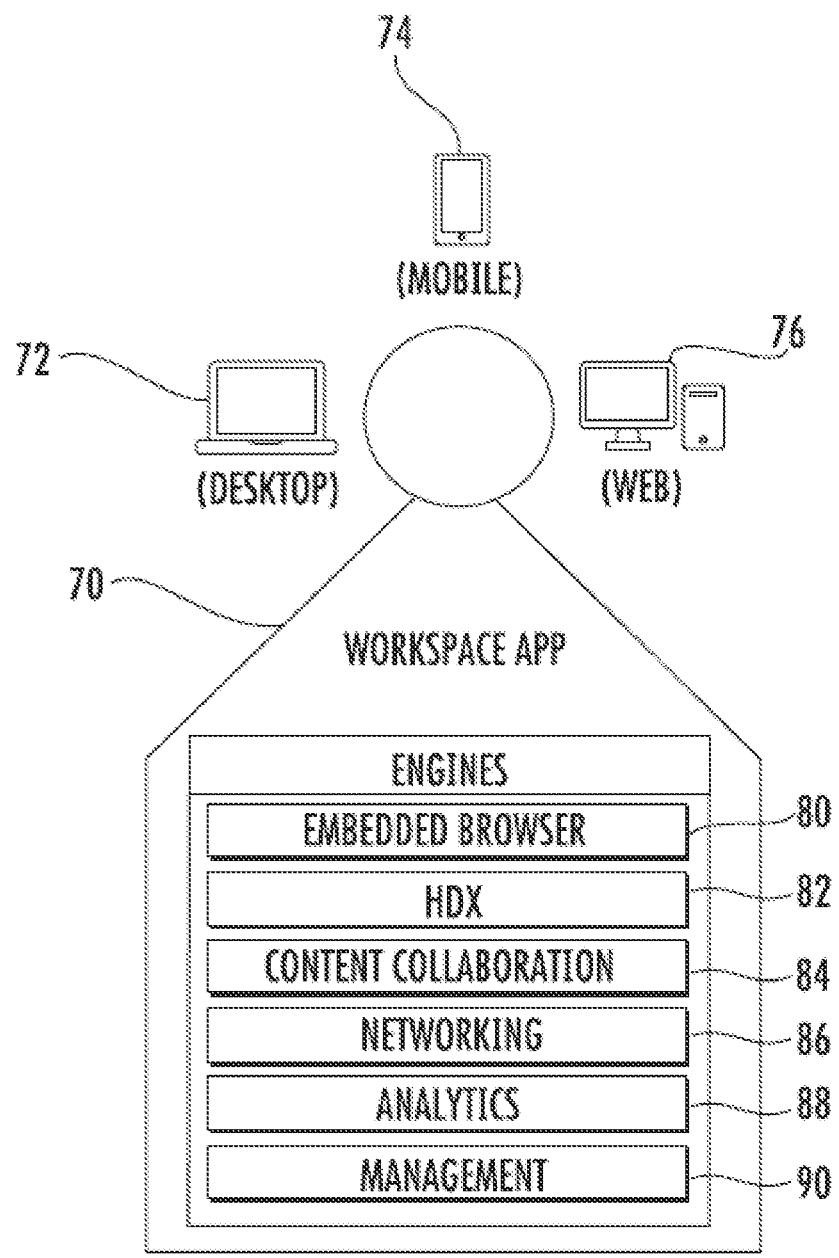
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
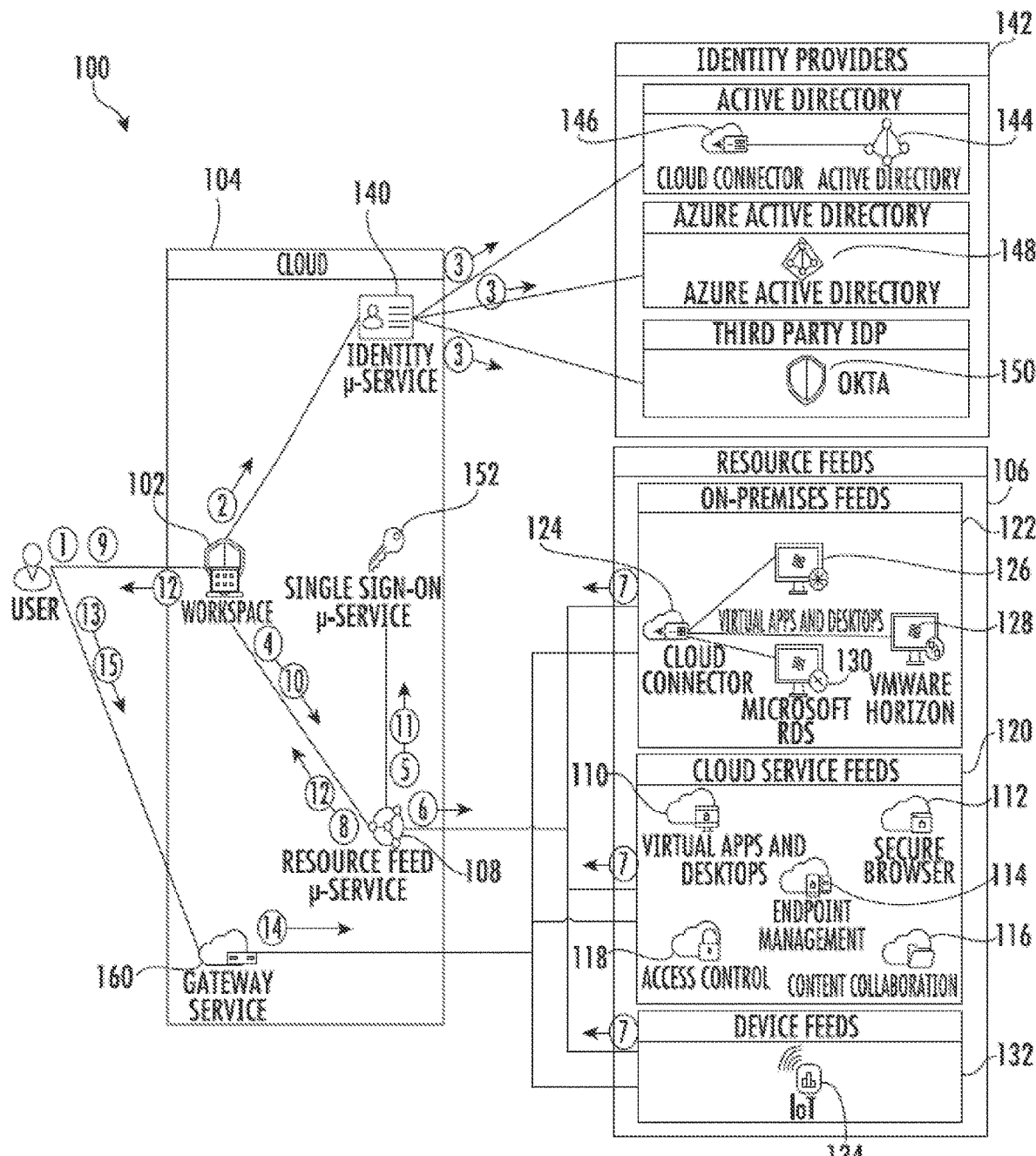
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a username and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third-party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
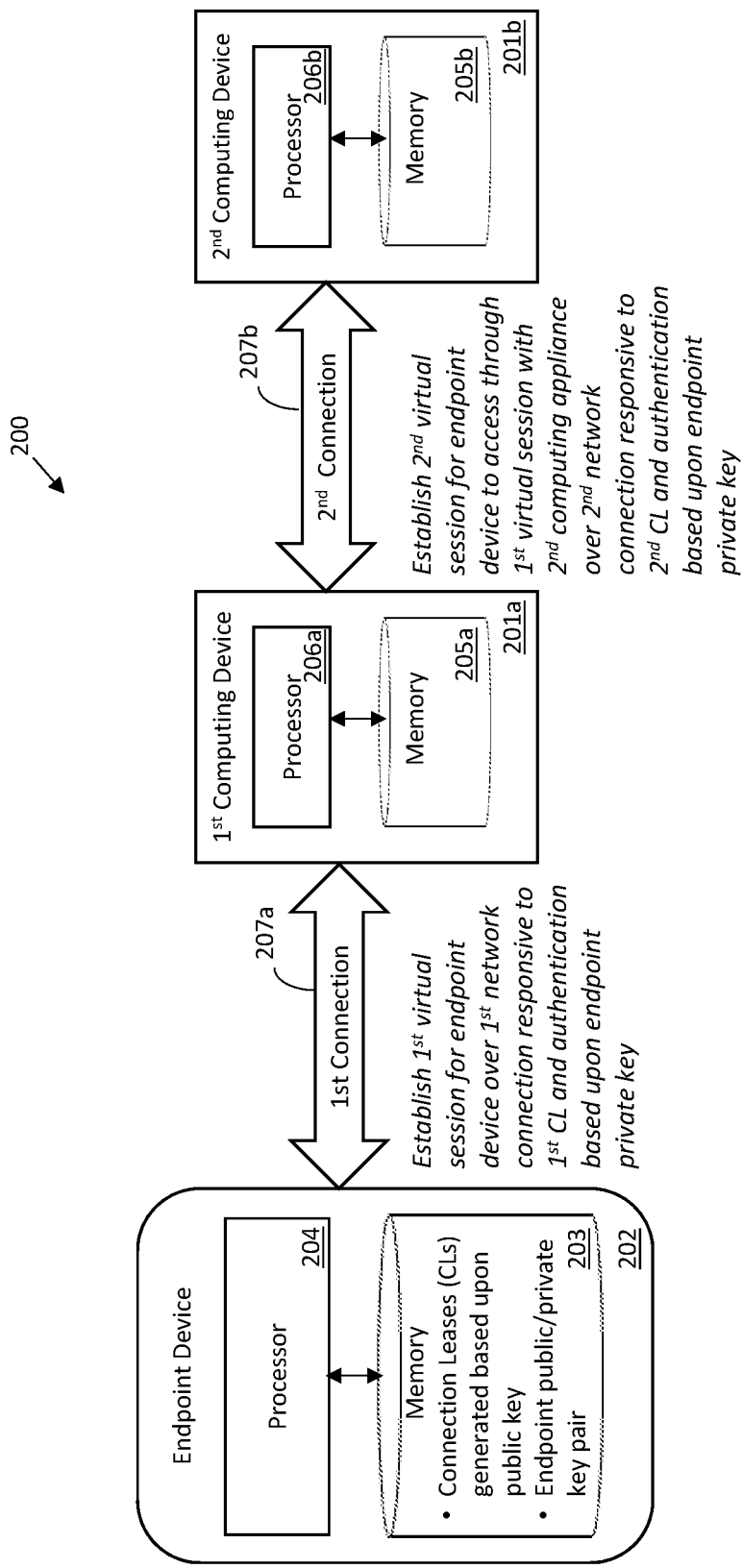
FIG. 6 is a schematic block diagram of a computing system providing multiple levels of connections to virtual sessions based upon connection leases in accordance with an example embodiment.

Turning now to FIG. 6, a computing system 200 which may provide second or higher-level connections to virtual sessions based upon connection leases is now described. The system 200 illustratively includes a first computing appliance 201a (such as a virtual delivery appliance, as will be discussed further below) including a memory 205a and a processor 206a configured to cooperate with the memory to establish a first virtual session for an endpoint device 202 over a first network connection 207a. By way of example, the endpoint device 202a may be desktop or laptop computer, tablet computer, smartphone, etc., as noted above. The endpoint device 202 is configured to request connections to virtual sessions using connection leases issued (e.g., by a Connection Lease Issuing Service (CLIS)) based upon published resource entitlements for virtual desktops, apps, etc. The endpoint device 202 illustratively includes a memory 203 and processor 204. Moreover, the endpoint device 202 has an endpoint public/private key pair associated therewith stored in the memory 203, along with a plurality of connection leases generated (e.g., by a CLIS) based upon the endpoint public key.

The computing device 201a may accordingly establish the first virtual session responsive to a first one of the connection leases and authentication based upon the endpoint private key. Moreover, the processor 206a may further establish a second virtual session for the endpoint device 202 to access through the first virtual session with another computing appliance 201b over a second network connection 207b responsive to a second one of the connection leases and authentication based upon the endpoint private key. The second computing device 201b may also be a virtual delivery appliance, and it similar a memory 205b and processor 206b.

By way of example, the system 200 may be implemented using the above described computing devices, and in some implementations within the workspace infrastructure, as will be discussed further below. Another example architecture for providing access to virtual computing sessions is Citrix Virtual Apps and Desktops (CVAD) from the present Applicant Citrix Systems, Inc. Citrix Virtual Apps is an application virtualization solution that helps optimize productivity with universal access to virtual apps and server-based desktops from different client devices. CVAD carries all the same functionality as Citrix Virtual Apps, plus the option to implement a scalable Virtual Desktop Infrastructure (VDI). Citrix Virtual Apps/CVAD are available as a cloud service or a traditional software configuration.

Such computer virtualization infrastructures may traditionally utilize an Independent Computing Architecture (ICA) protocol and ICA files for authenticating client devices to access the virtual sessions and computing resources to which the users are entitled. ICA is a protocol designed for transmitting Windows graphical display data as well as user input over a network. ICA files contain short-lived Secure Ticket Authority (STA) and logon tickets. The STA ticket may be used to authorize a connection to a virtual delivery appliance (e.g., Citrix Virtual Delivery Agent (VDA)) via a Gateway (e.g., Citrix Gateway). The logon ticket may single-sign-on (SSOn) the user into the virtual computing session. In the case of CVAD, this is done through a "high-definition" experience (HDX) session, which may be available to users of centralized applications and desktops, on different client devices and over different networks. Citrix HDX is built on top of the ICA remoting protocol.

With any network infrastructure, remote or otherwise, security from external attacks is always a significant concern. Moreover, connection leases are relatively long-lived (e.g., a few hours to weeks based on policies), and since the attack opportunity window is therefore increased, the security requirements are also increased compared to traditional ICA files. Therefore, connection leases are encrypted and signed. Connection leases may also be revoked to cope with events such as stolen devices, compromised user accounts, closed user accounts, etc. Connection lease revocation may be applied when a client/endpoint device or host is online with respect to a CLIS or broker. However, the CLIS or broker does not typically have to be online for a client to use a previously issued connection lease, since connection leases are meant to be used in an offline mode.

Figure 7:
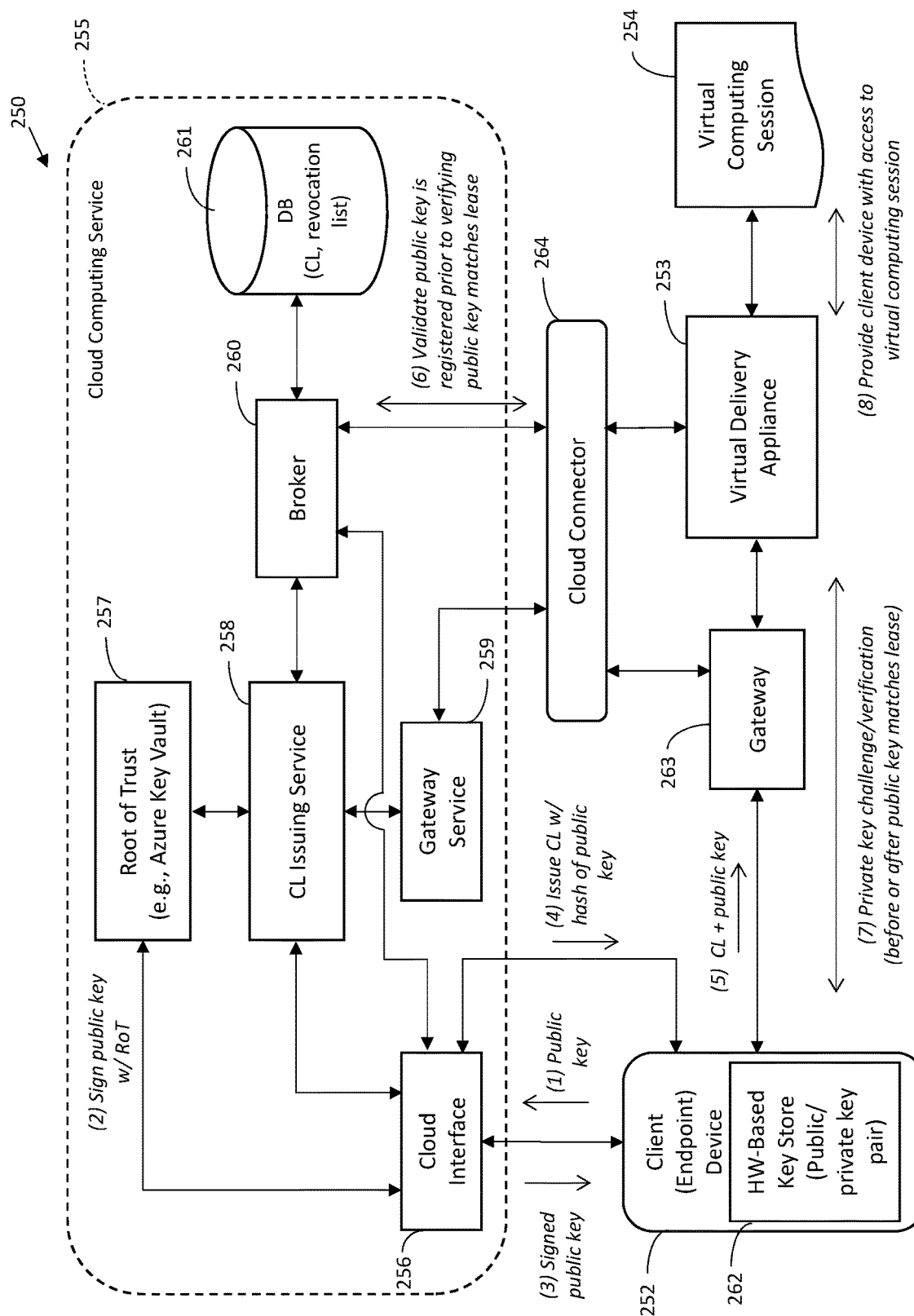
FIG. 7 is a schematic block diagram of a connection lease architecture and independent flow sequences in which the system of FIG. 6 may be implemented in accordance with an example embodiment.

The foregoing will now be further described in the context of an example implementation of a computing system 250 shown in FIG. 7. In the illustrated example, the above-described lease generation and storefront functions are performed within a cloud computing service 255 (e.g., Citrix Cloud) which illustratively includes a cloud interface 256 configured to interface with a client (endpoint) device 252 for enrollment and lease generation to access virtual sessions 254. In an example embodiment, the cloud interface 256 may be implemented with Citrix Workspace, and the client device 252 may be running Citrix Workspace App, although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases, in contrast to a legacy virtual delivery appliance which is not. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature nature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing.

Figure 8:
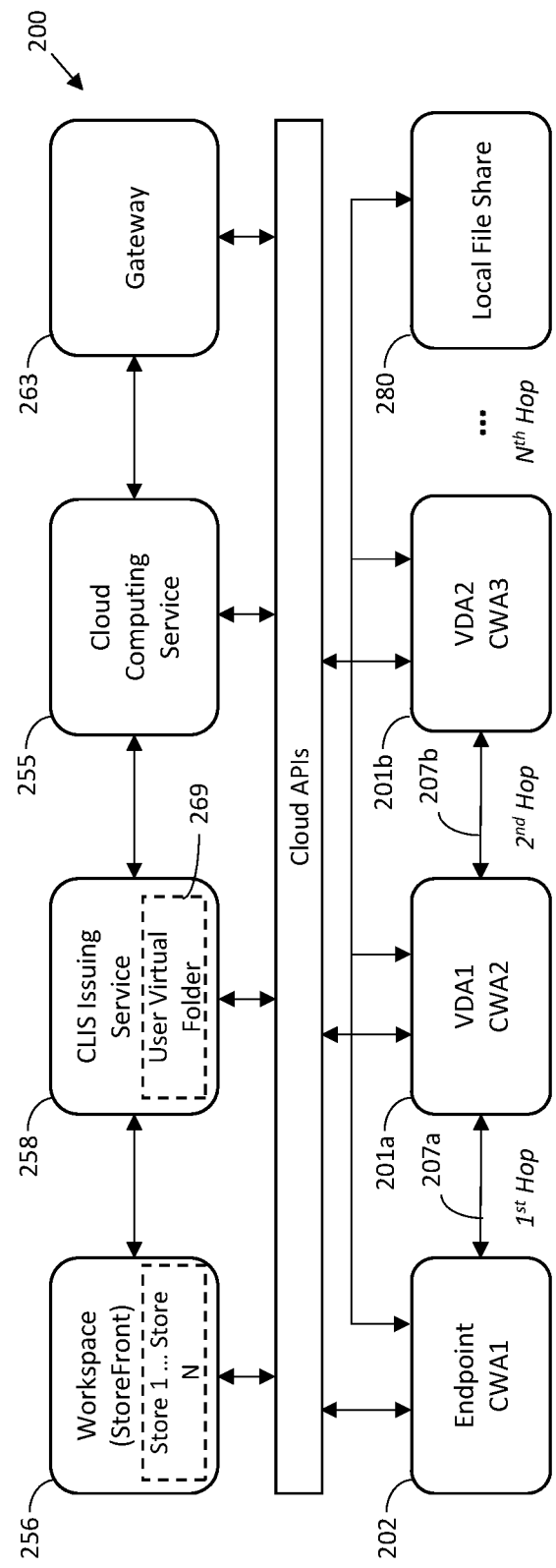
FIG. 8 is a schematic block diagram of an example implementation of the system of FIG. 6 using the connection lease architecture of FIG. 7.
Figure 9:
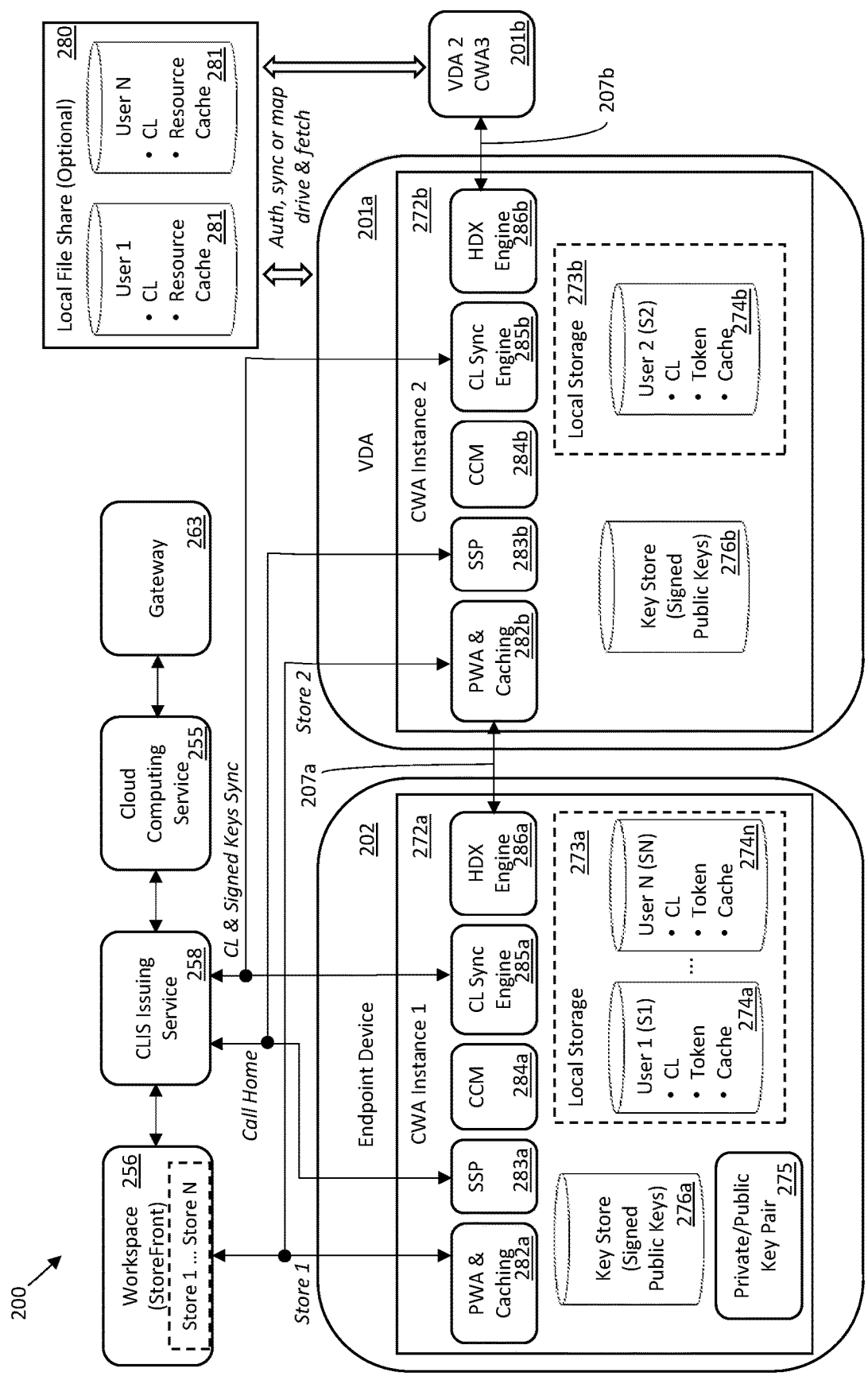
FIG. 9 is a schematic block diagram showing an example implementation of the system of FIG. 8 in greater detail.
Figure 10:
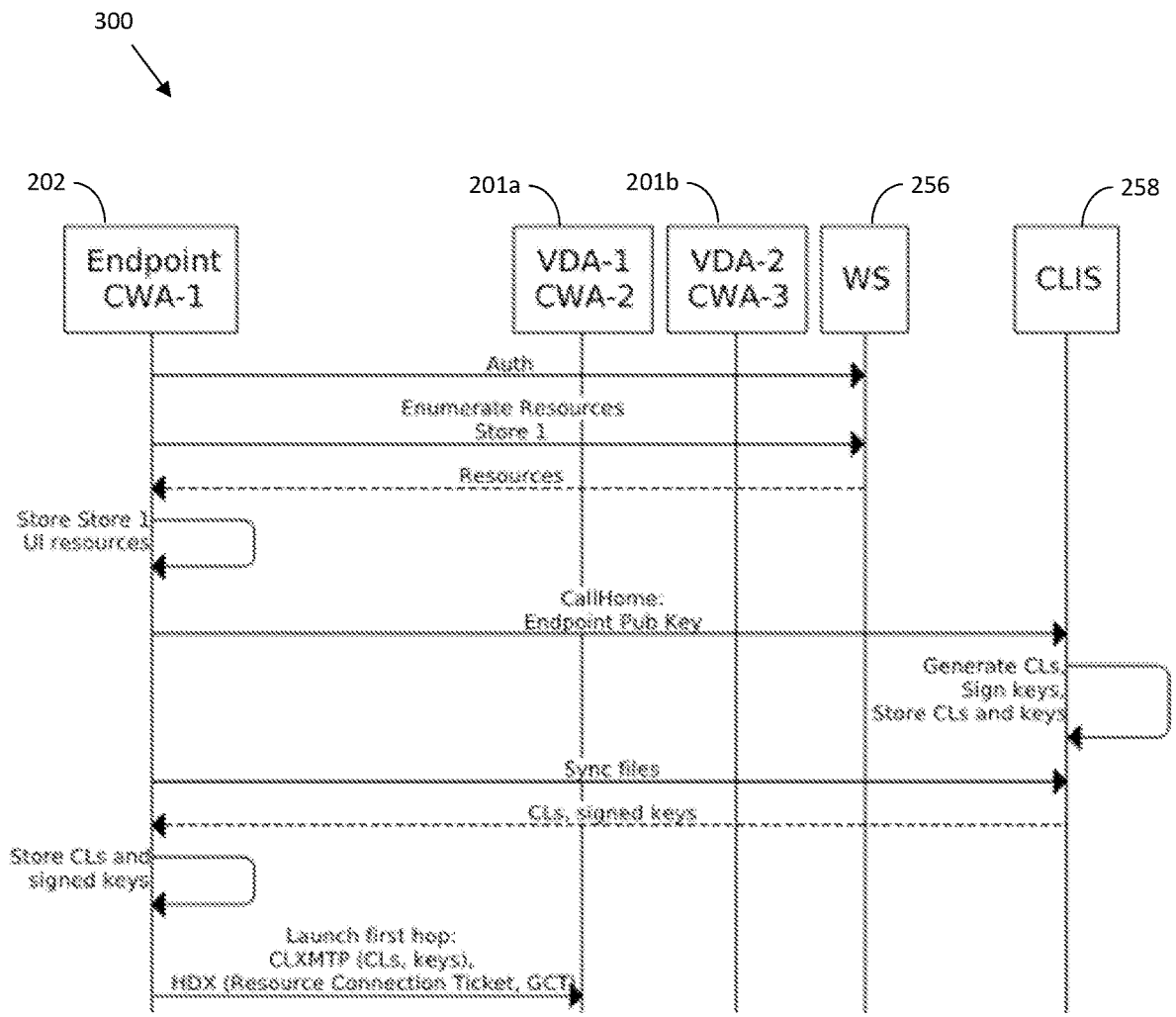
FIGS. 10-13 are a series of sequence diagrams illustrating method aspects associated with the system of FIG. 9.
Figure 11:
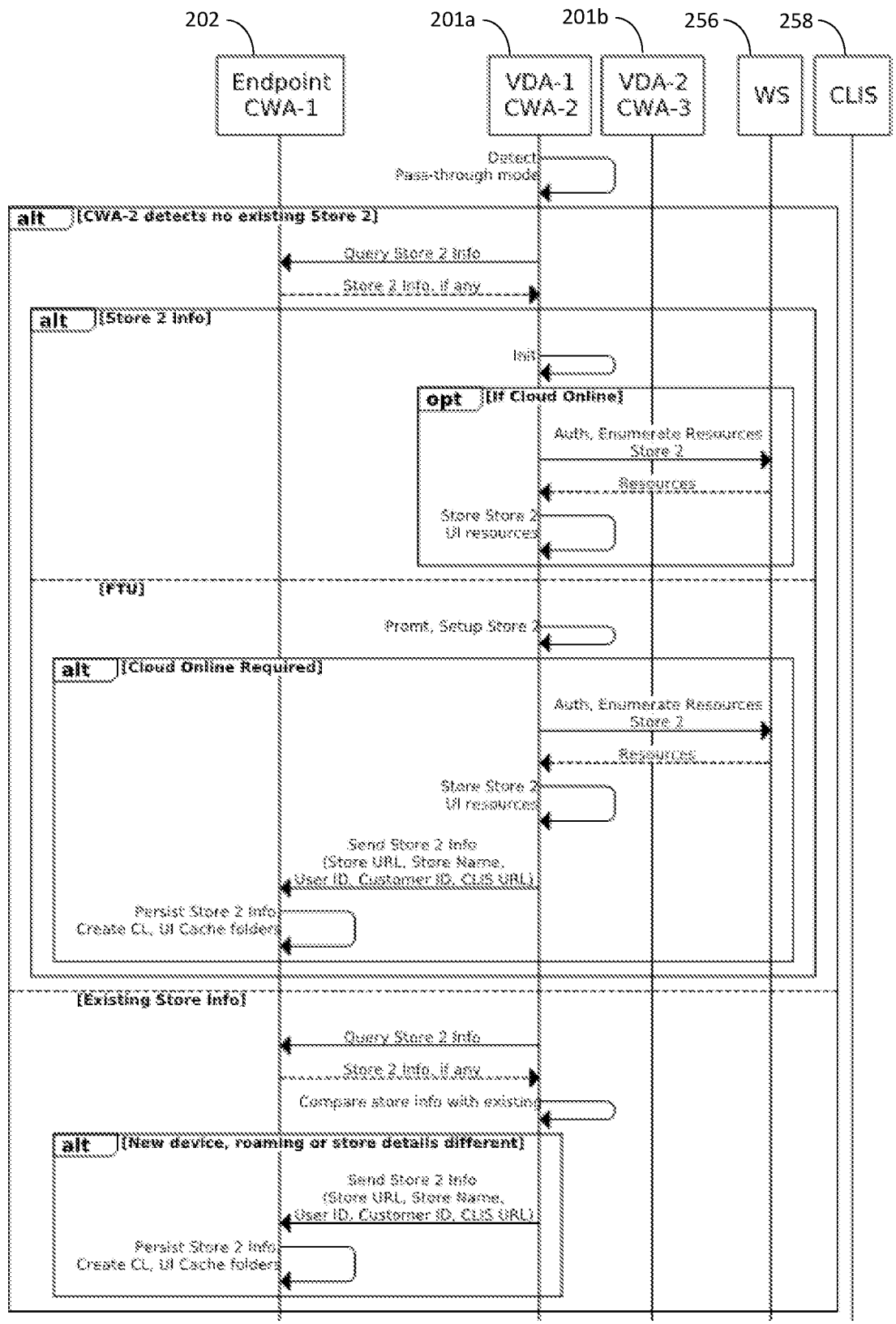
Figure 12:
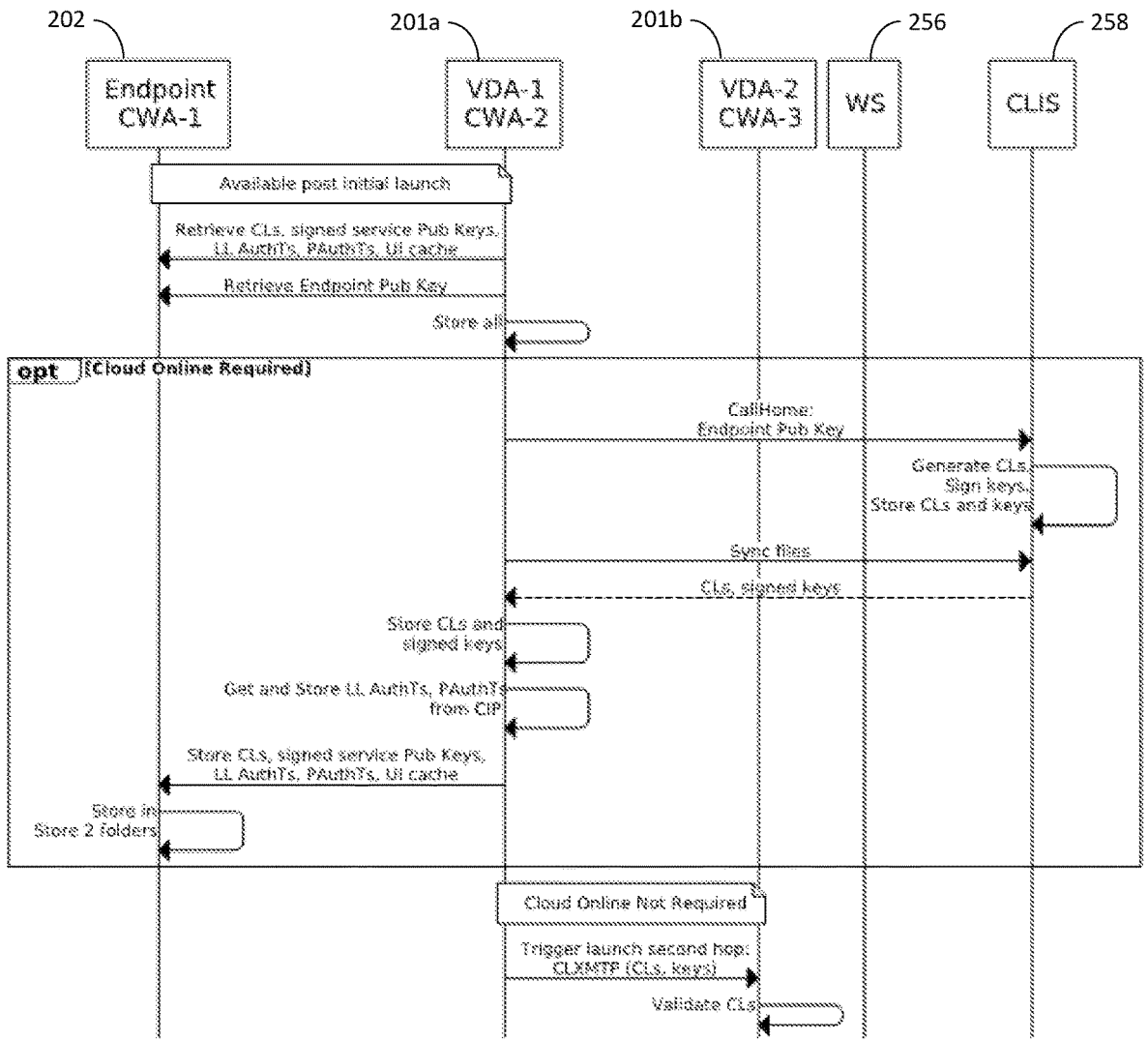
Figure 13:
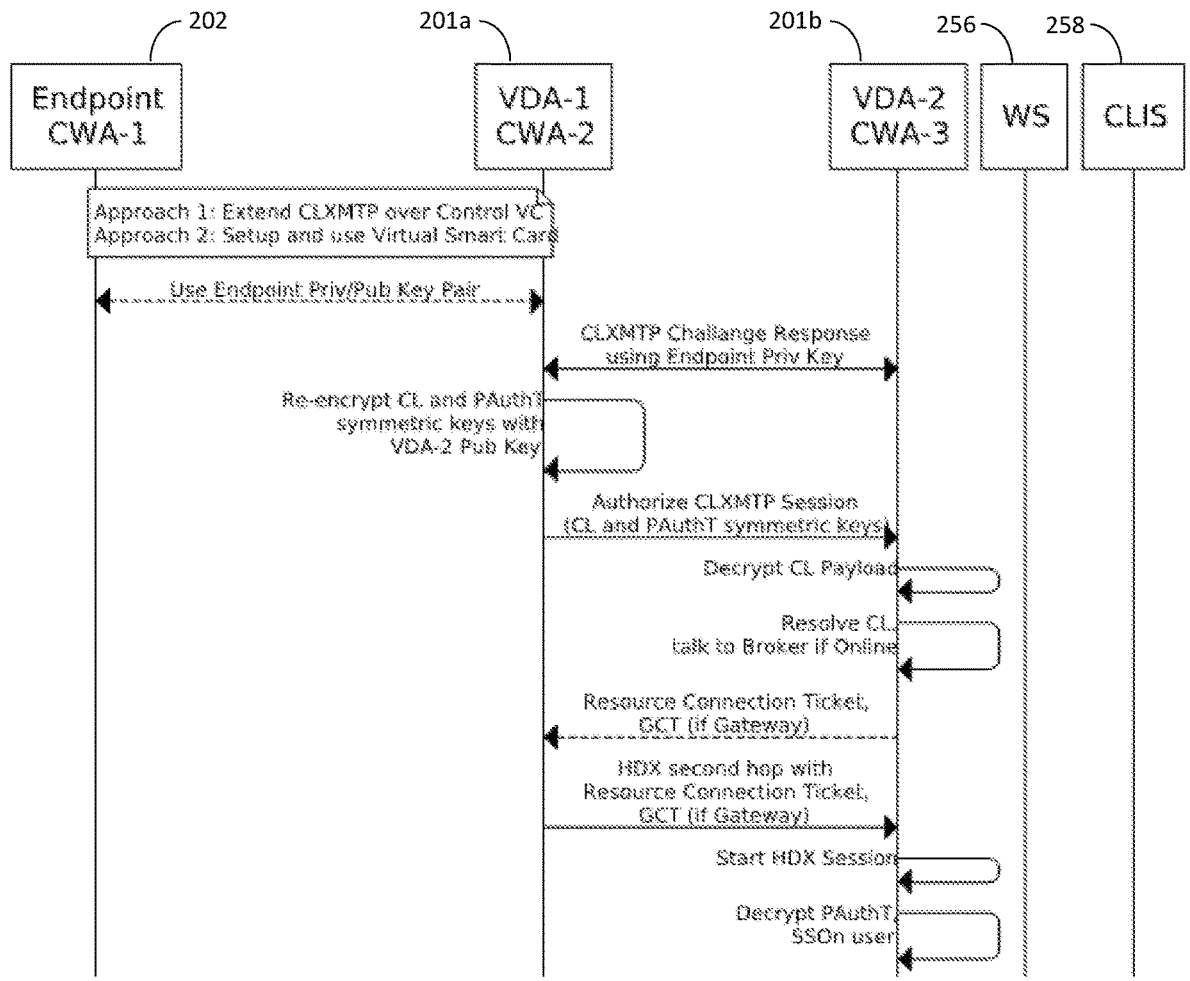

Referring additionally to FIGS. 8 and 9, an example implementation of the system 200 utilizing the connection lease infrastructure shown in FIG. 7 is now described. In the illustrated example, the endpoint 202 is running a first instance of CWA 272a (CWA1), through which it establishes a first virtual session through a first virtual delivery appliance 201a (VDA1) over a first network connection or hop 207a. The first virtual delivery appliance 201a then establishes a second virtual session through a second virtual delivery appliance 201b (VDA2) over a second network connection or hop 207b. This process may continue for additional virtual sessions over additional hops in some embodiments.

By way of background, computing devices or services such as an always fresh new instance of a pooled VDA, a randomly assigned Remote Session Desktop Host (RDSH) (e.g., in a Terminal Server/multi-user environment), a Citrix Secure Browser service, etc., would not ordinarily have access to a user's CLs and UI cache which are securely stored at the endpoint device 202. In these types of virtual environments, even after the second CWA instance 272b running within the first virtual session is configured, there will be no data persistence between sessions. Even on RDSH, for security reasons, most customers configure policies to clean up all user-data such as the user profile from the machine upon logoff.

Once the user logs out and later creates a new session, CWA in the new virtual session will need to request CLs to be generated and synced again, and a user interface (UI) cache will need to be re-created as well. The UI cache is the particular user information that is utilized in generating the specific user interface rendered for a given user. In case of an outage, for example, CWA will not be able to perform these operations.

Furthermore, in the hosted (virtual) environments described above, a physical Trusted Platform Module (TPM) that is used to secure items such as encryption keys, certificates and passwords typically does not exist. Even when a physical TMP exists, there is no persistence between different user sessions. Different physical hardware (and therefore different TPM instances) may be combined with persistent OS instances, identity disks and user layers for each new user session with a VDA. However, CL generation and subsequent use thereof via a CL exchange protocol require access to a persistent private/public key pair. Thus, only a "mid-day" type of outage where the user has maintained a permanent connection to a remote desktop, for example, would be handled correctly in the above-described second hop scenario.

As noted above, these challenges can make connection leasing unusable in double or multi-hop virtualization scenarios. In the present example, a user may use the first CWA instance 272A at the endpoint device 202 to connect to a virtual desktop via the first virtual delivery appliance 201a (VDA1). Then within the virtual desktop, a second CWA instance accessed through the second virtual delivery appliance 202b (VDA2) allows the user to connect to a same or different store and launch additional published apps and/or desktops. This would otherwise not be possible, as the second virtual delivery appliance 202b would ordinarily look to the first virtual delivery appliance 201a as the endpoint for second virtual session, but the first virtual delivery appliance does not have access to the endpoint private key needed to validate the connection lease (because the endpoint private key is securely stored with the TMP of the endpoint device 202).

However, the system 200 allows for multi-hop connection leasing across multiple levels of network connections or hops. More particularly, the requisite CLs, auth tokens, and UI cache bound to the endpoint device 202 may not only be cached at the endpoint device, but also at the first virtual delivery appliance 201a as well. Furthermore, direct access to the private/public key pair of the endpoint device 202 is made available to the first virtual delivery appliance 201a without physically transferring or otherwise compromising the private key of the endpoint device. As will be discussed further below, this may be done by extending a trusted connection lease exchange protocol used for exchanging connection leases over a control virtual channel to provide access to the endpoint private key for verification operations. In accordance with another example approach, a virtual smart card may be established providing endpoint private key authentication to the first virtual delivery appliance 201a with crypto-level and/or PC/SC smart card-level redirection. In either case, the endpoint private key never leaves the endpoint so that crypto key security is maintained.

For reference, in FIGS. 8 and 9 and the accompanying discussion below, the following definitions and abbreviations are used:

CWA1 - first CWA instance 272a running on the endpoint device 202;
CWA2 - second CWA instance 272b running within a virtual session on VDA1.
Store 1 - Workspace store with published resources to which CWA1 connects.
Store 2 - Workspace store with published resources to which CWA2 connects (may be the same or different from Store 1);
Connection Lease Exchange and Mutual Trust Protocol (CLXMTP)
Gateway Connection Ticket (GCT)
Citrix Identity Platform (CIP)
Long-lived Auth Token (LL AuthT)
Polymorphic Auth Tokens (PAuthT)
Personal Computer/Smart Card (PC/SC)
Cryptographic Service Provider (CSP)
Key Storage Provider (KSP)
First Time Use (FTU)

User CLs are stored at the endpoint device 202. These CLs are bound to the endpoint private/public key pair, such as by using the endpoint private/public key pair to encrypt the connection lease, and/or embedding a version of the endpoint public key signed by the RoT 257 in the connection lease, for example. In the illustrated example, user CLs are stored in an optional local file storage 273a, 273b (FIG. 9) in respective stores 274a-274n. The CWA apps 272a, 272b illustratively include a PWA and in-app caching module 282a, 282b, a Self-Service Plugin (SSP) 283a, 283b which may perform calls home to the CLIS 258, a common connection manager 284a, 284b, a CL synch engine 285a, 285b which communicates with the CLIS 258, and an HDX engine 286a, 286b for communicating with gateways 263 and/or virtual resources (SaaS/DaaS servers, etc.).

The endpoint private/public key pair may be stored in a key store 275 (e.g., by a TPM). Signed public keys (e.g., for the gateway 263, virtual delivery appliances 201a, 201b, etc.) may be stored in key stores 276a, 267b in local storages or caches 273a, 273b. The CWA instances 272a, 272b may optionally sync CLs and upload them to the local file share 280. The local file share 280 may have a dedicated sync service to sync all CLs from the Cloud computing service 255. This does not pose a security risk because user specific and group level CLs are already bound to the specific private/public key pairs, as described above.

In the illustrated example, the private/public key pair of the endpoint device 202 is used to bind the CLs and LL AuthTs/PAuthTs of the second CWA instance 272b to the endpoint device 202. The second CWA instance 272b operates in a "pass-through" mode allowing the endpoint device 202 to perform user authentication using its private/public key pair, and to request CLs, signed public keys, LL AuthTs, PAuthTs, and UI data in the virtual session. This data may then be cached at both the first virtual delivery agent 201a and the endpoint device 202.

In accordance with one example embodiment, access to the private/public key pair of the endpoint device 202 by the second CWA instance may be achieved by extending a CLXMTP protocol connection between the endpoint device and the first virtual delivery appliance 201a over a control virtual channel, for example. To perform a CLXMTP CL exchange, the endpoint device 202 is configured to cooperate with the virtual delivery appliance 201a to establish a transport layer session between the endpoint device and virtual delivery appliance, establish a presentation layer session via the transport layer session, and establish a connection lease exchange tunnel via the presentation layer session. The virtual delivery appliance 201a may accordingly receive a connection lease from the endpoint device 202 through the connection lease exchange tunnel, and then perform the above-described lease validation process with the broker computing device 260. The virtual delivery appliance 201a may further issue a resource connection ticket to the endpoint device 202 through the connection lease exchange tunnel responsive to the validation. This tunnel may then be further extended over a control virtual channel to allow the endpoint device 202 to perform validations requested by the second virtual delivery appliance 201b, etc., through the first virtual delivery appliance 201a.

By way of example, the presentation layer session may be a Common Gateway Protocol (CGP) session, and the transport layer session may be a Transport Layer Security (TLS) session or a Transmission Control Protocol (TCP) session. Also by way of example, the transport layer session may comprise at least one of an Enlightened Data Transport (EDT) session, Datagram Transport Layer Security (DTLS) session, and a User Datagram Protocol (UDP) session. It should be noted that in some embodiments (such as the one shown in FIG. 7), a gateway 263 may be used to relay communications between the endpoint device 202 and first virtual delivery appliance 201a, in which case a CLXMTP tunnel may be established between the endpoint and the gateway, and also between the gateway and the first virtual delivery appliance. CLXMTP tunnels may be similarly established between the virtual delivery appliances 201a, 20b as well as other computing devices.

In a second example embodiment, access to the private/public key pair of the endpoint device 202 by the second CWA instance 272b may be achieved by setting up a virtual smart card. This approach may utilize a secure TLS/DTLS connection, for example. In any event, whether by virtual smart card or a CLXMTP tunnel over a control virtual channel, or other approach, the private key of the endpoint device 202 never has to leave the endpoint device. Both of these approaches will be discussed further below.

Different approaches may be utilized for preserving and re-initializing the second CWA instance with user-store information from the storefront 256 (Workspace StoreFront in the present example). To prevent the second CWA instance's CLs stored at the endpoint device 202 from becoming stale or expiring (e.g., if a user does not perform a second/multi-hop operation and run the second CWA instance for an extended time), additional optimizations may be applied. As will be discussed further below, local file share 280 synching of freshly generated CLs may be performed for users in good standing, or delegating CL request and sync operations to the endpoint device 202.

Referring additionally to the sequence diagram 300 shown in FIGS. 10-13, an example multi-hop connection sequence which may be performed by the system 200 is now described. The first CWA instance 272a connects to Store 1 of the storefront 256. The first CWA instance 272a then connects to a virtual desktop or a published second CWA instance 272b with the second virtual delivery appliance 272b. This may be accomplished via traditional ICA files, or via CLs and UI caching at the endpoint device 202, for example. If CLs are used, the first CWA instance 272a has the private/public key pair in the key store 275, as well as signed public keys for the endpoint device 202, CLIS 258, and RoT 257 in the key store 276a. CLXMTP runs from the endpoint device 202 to the first virtual delivery appliance 201a.

The second CWA instance 272b detects virtual session conditions and starts operating in a pass-through mode, that is, for passing through CL (or other) authentication requests from the second virtual delivery appliance 201b, etc., to the endpoint device 202 (first CWA instance 272a) for authentication using the endpoint private key. If the second CWA instance 272b detects no existing store configuration, this may be an FTU event, or it may be a subsequent launch but with the first virtual delivery appliance 201a re-initialized, re-provisioned, etc. The second CWA instance 272b will have no prior setup information, so it queries user-store details from the first CWA instance 272a over a control virtual channel, for example, as discussed further below.

If user-store details are returned from the first CWA instance 272a, the second CWA instance 272b initializes itself and points to Store 2 in the present example. Otherwise, an FTU event has occurred. When cloud online conditions are available, the second CWA instance 272b prompts the user to setup the store, and the second CWA instance connects to Store 2 in the present example. The second CWA instance 272b uses a control virtual channel, for example, to send user-store details to the first CWA instance 272a at the endpoint device 202. These details may include store discovery URL, store name, user ID, customer ID, etc. Optionally, a CLIS URL may also be included, as will be discussed further below. The first CWA instance 272a creates separate CL and UI cache folders per user-store on behalf of the second CWA instance 272b.

When the second CWA instance 272b detects an existing store configuration, the second CWA instance still queries user-store details from the first CWA instance 272a over the control virtual channel. If the first CWA instance 272a returns no details (e.g., new endpoint device 202, roaming, etc.) or user-store details are different, the second CWA instance 272b uses the control virtual channel to send user-store details to the first CWA instance 272a, and the first CWA instance creates separate CL and UI cache folders per user-store on behalf of the second CWA instance.

The second CWA instance 272b retrieves CLs, signed service Public Keys (CLIS, RoT), LL AuthTs, PAuthTs, and UI cache from first CWA instance 272a at the endpoint device 202 using the control virtual channel (which is available post initial launch, for example). The second CWA instance 272b retrieves the endpoint public key from the endpoint device 202 using the above-noted control virtual channel approach or the virtual smart card approach, which are described further below. The second CWA instance 272b requests CLs, signed endpoint public key, and signed service public keys (CLIS, RoT) by calling LeaseCallHome to the CLIS 258, provided that cloud services are available. The second CWA instance 272b syncs down CLs, all signed public keys (for the endpoint device 202, CLIS 258, RoT 257) from the CLIS 258, LL AuthTs, PAuthTs from CIP, and UI data (static+dynamic) from Workspace 256. Using the control virtual channel, the second CWA instance 272b stores both at the first virtual delivery appliance 201a and the endpoint device 202 the following: CLs; signed pub keys (for the endpoint device 202, CLIS 258, RoT 257); LL AuthTs, PAuthTs; and UI cache.

The user triggers a launch of a published resource (of Store 2) using the second CWA instance 272b in the virtual session. This triggers a second hop or network connection 207b to the second virtual delivery appliance 201b. CLXMTP runs from the first virtual delivery appliance 201a to the second virtual delivery appliance 201b. More particularly, CLXMTP retrieves CLs from the first virtual delivery appliance 201a and/or the endpoint device 202. Retrieval from the endpoint device 202 happens over the control virtual channel. Furthermore, CLXMTP performs a challenge response (to establish trust) by using the endpoint private key in the present example, although a virtual smart card may also be used as will be discussed further below. CLXMTP then performs session authorization by re-encrypting symmetric keys for the second virtual delivery appliance 201b, which requires the use of the endpoint private key in the present approach. The first CWA instance 272a re-encrypts the CL-payload symmetric key with the second virtual delivery agent 201b public key and relays it via the second CWA instance 272b to the second virtual delivery appliance 201b. Thus, the second virtual delivery appliance 201b is able to decrypt the CL payload. Similarly, the first CWA instance 272a re-encrypts the PAuthT payload symmetric key with the second virtual delivery appliance 201b public key and relays it via the second CWA instance 272b to the second virtual delivery appliance 201b. Thus, second virtual delivery appliance 201b is able to decrypt and process the PAuthT payload and single sign-on (SSOn) the user into the second-hop virtual session.

Both GCT and the VDA resource connection ticket are handled by the first delivery appliance 201a, as would normally be handled by the first CWA instance 272a in a non-passthrough mode. They may be retrieved over CLXMTP and then used over HDX to authorize a connection via the gateway 263 and attach to the pre-authorized second-hop HDX session. At this point, the second-hop virtual session at the second virtual delivery appliance 201b is authorized and starts, which concludes the multi-hop launch.

With respect to initializing the second CWA instance 272b with user-store information, different approaches are possible for the second CWA instance 272b to store user and store (discovery URL, etc.) information. At the endpoint device 202 over the control virtual channel with the first CWA instance 272a, one approach is that the first CWA instance 272a always assumes the same user-store information for multi-hop operation. This association is established after launching any published resource and running a second CWA instance 272b as described above. Then, the first CWA instance 272a initializes second CWA instance 272b with the information.

Another example approach is that the first CWA instance 272a associates published resources (e.g. Desktop 1, published CWA) with corresponding user-store information at the endpoint device 202. This association is established after a first launch of a particular published resource and running a second CWA instance 272b as described above. Then, the first CWA instance 272a initializes the second CWA instance 272b with the requisite information. Yet another example approach is that the first CWA instance 272a may send the locally persisted store information via the second hop. In outage conditions, the second CWA instance 272b may present a "store selector" UI, and the first CWA instance 272a may prompt the user for local authentication (e.g. PIN or biometric), etc.

Further details are now provided on implementing the above-described multi-hop pass-through mode by extending CLXMTP over a control virtual channel. The second CWA instance 272b retrieves the endpoint public key from the endpoint device 202 over the control virtual channel. The CLXMTP tunnel is also created over the control virtual channel between the first CWA instance 272a at the endpoint 202 and the second CWA instance 272b the at first virtual delivery appliance 201a. A challenge response by CLXMTP (on the second hop) is extended and performed over the CLXMTP/control virtual channel over the first hop. This ensures access to the endpoint private key. The first CWA instance 272a also obtains the public key of the second virtual delivery appliance 201b over the CLXMTP/control virtual channel. Moreover, the first CWA instance 272a re-encrypts the CL payload symmetric key with the second virtual delivery appliance 201b public key and sends it to the second CWA instance via the CLXMTP/Control VC.

The second CWA instance 272b then forwards the CL payload symmetric key encrypted with the second virtual delivery appliance 201b public key to the second virtual delivery appliance over the second-hop CLXMTP. Similarly, the first CWA instance 272a re-encrypts the PAuthT payload symmetric key with the second virtual delivery appliance 201b public key and sends it to the second CWA instance 272b via the CLXMTP/control virtual channel. The second CWA instance 272b then forwards the PAuthT payload symmetric key encrypted with the second virtual delivery appliance 201b public key to the second virtual delivery appliance over the second-hop CLXMTP.

Further details are now provided on implementing the above-described multi-hop pass-through mode using a virtual smart card. In this example implementation, a combination of Personal Computer/Smart Card (PC/SC) redirection and fast smart card (cryptographic-level) HDX redirection may be leveraged. The endpoint private/public key pair may be exposed as a virtual smart card (derived credential) to the second CWA instance 272b. Thus, unlike the CLXMTP extension approach described above, the first CWA instance 272a and second CWA instance 272b do not have to perform all of the CLXMTP steps. The first CWA instance 272a at the endpoint device 202 sets up a "fake" reader corresponding to the virtual smart card, and the user is prompted for a smart card PIN (or biometric, etc.). A fast smart card virtual channel protocol may be used to retrieve a certificate (public part) and perform signing, challenge-response, and decrypting operations. A smart card virtual channel protocol may also be used for establishing smart card resource manager context, enumerating the fake smart card reader, getting reader state, etc.

With respect to the smart card and fast smart card virtual channel approach, if the first virtual delivery appliance 201a is given access to the endpoint public/private key pair and is able to use it as if it was a local (to the first virtual delivery appliance) public/private key pair, changes to both the endpoint device 202, first CWA instance 272a and the pass-through second CWA instance 272b (running on the first virtual delivery appliance 201a) may be minimized. In practice, this may be done by having the first CWA instance 272a create a virtual smart card, which contains the endpoint public/private key pair (as a certificate). The virtual smart card may then be remoted over the HDX protocol with the smart card virtual channel with either the PC/SC redirection or fast smart card cryptographic redirection. Fast smart card is the simplest approach of the two because it is easier to create a virtual smart card at the cryptographic level (versus at the PC/SC level). Regardless, parts of the PC/SC protocol may be used, e.g., enumerate SC reader, reader state, etc.

To create a virtual smart card, an existing private/public key pair is loaded into a virtual smart card container. Operations to be implemented in order to use a virtual smart card at the cryptographic level may include: retrieving the public key; signing a hash with the private key; and decrypting encrypted data (e.g., a symmetric key) with the private key. In addition, the first CWA instance 272a may simulate the basic functionality of a smart card reader with an inserted smart card. This translates into returning a reader name to the PC/SC API SCardGetStatusChange and setting the corresponding bitmask to indicate an inserted smart card ready to use. The virtual smart card reader and associated driver do not have to physically exist.

With fast smart card, the second CWA instance 272b at the first virtual delivery appliance 201a may use the endpoint public/private key pair as if it was local to the intermediary of a smart card Cryptographic Service Provider (CSP) or Key Storage Provider (KSP) via the corresponding cryptographic APIs. The sequence of operations over the smart card virtual channel is "hidden" by the CSP (or the KSP). This sequence involves acquiring a cryptographic context for the smart card CSP/KSP. The name of the smart card reader may be designated as the simulated/fake reader. This translates into a request/response over the smart card virtual channel to retrieve the public key, i.e., there is only one container on the virtual smart card. The public key is then stored in the CSP/KSP, i.e., it is associated with the cryptographic context. The sequence further involves calling the crypto Application Programming Interface (API) of the CSP/KSP to sign a hash. This translates into a request (hash) and then the corresponding response (signed hash) over the smart card virtual channel. Furthermore, the sequence also involves calling the crypto API of the CSP/KSP to decrypt encrypted data (e.g., a symmetric key). This translates into a request (encrypted data) and then the corresponding response (decrypted data) over the smart card virtual channel.

Various other features may be implemented in different embodiments. Because CLs are tied to an endpoint device 202 (that is, they are user-device bound), the ability to periodically refresh the CLs related to the second CWA instance 272b and Store 2 would normally depend on how often the user uses the second CWA instance in a double/multi-hop scenario. This may result in stale/expired CLs at the endpoint device 202 in some cases. The same applies to UI cache and LL AuthTs/PAuthTs. One example enhancement which may be applied to overcome this technical challenge is the use of the local file share(LFS) 280. When it is available, the second CWA instance 272b may store/retrieve CLs+UI cache also to/from the local file share 280. Once the user logs into the first virtual delivery appliance 201a, this may be done with SSOn.

The LFS 280 may have an associated service that syncs users' CLs in the background. More particularly, CLIS 258 periodically re-issues CLs for users in good standing. This helps with cases where the CLs originally stored at the endpoint device 202 have expired, e.g., if a user has not performed a second-hop and run the second CWA instance 272b for a while. Signed public keys may be stored at the endpoint device 202 and first virtual delivery appliance 201a, but typically would not be stored at the LFS 280. So, while the LFS 280 will robustly help with UI Cache, there may be a potential issue with CLs, because CLs are to be used with the signed public keys. However, key rotation of public keys is generally performed less often than the CL refresh period, and also primary and secondary versions of public keys may be used to help prevent issues during rotation to provide a working improvement.

Another optional feature which may be applied is the use of a delegated CL request and sync. This example approach helps the first CWA instance 272a maintain fresh CLs and signed public keys for the second CWA instance 272b. Just like CLs, LL AuthTs for the second CWA instance 272b are bound to the endpoint device 202 and are stored at both the endpoint device and the first virtual delivery appliance 201a. Store URL and other discovery URLs are provided from the second CWA instance 272b to first CWA instance 272a. In particular, the first CWA instance 272a may call LeaseCallHome to the CLIS URL on behalf of the second CWA instance 272b from the endpoint device 202 by using the LL AuthT for the second CWA instance 272b. The first CWA instance 272a may also sync down the freshly generated CLs and any newly signed (rotated) public keys using LL AuthT for second CWA instance 272b.

As noted above, CLs are tied to an endpoint device (i.e., they are user-device bound). Thus, in order for roaming to successfully work in cloud offline/outage conditions, the endpoint device 202 to which the user roams will need to have been used at least once in a double/multi-hop scenario during online conditions and thus initialized with CLs, UI Cache, etc., for the second CWA instance 272b and Store 2.

It should be noted that multiple hops (more than a double-hop) are also possible within the system 200 and work the same way as in the method steps described above for the second hop 207b. However, the endpoint private/public key pair is still utilized through the CLXMTP control virtual channel, or virtual smart card, as discussed above.

In multi-hop cases where the same store (e.g., Store 1) is used by the second CWA instance 272b, there is a potential that the second CWA instance may connect to the same desktop as first CWA instance 272a, thus causing a disconnect of the first hop since both CWA instances cannot be connected to the same desktop at the same time. To prevent this, the published resource ID may be communicated on individual hops so that the second CWA instance 272b may block launching of the same resource ID. Normally, in broker 260 online conditions, the broker may prevent this launch by retrieving the user session context of the second CWA instance 272b (running in a session) and checking if there is already an existing session for that published resource. In addition, the broker 260 may not enumerate this desktop resource to Workspace 256 when requested by the second CWA instance 272b. However, in outage conditions the Broker 260 may not be available, while CLs will still be available for launching. Therefore, the second CWA instance 272b can perform the safety check. Or the second CWA instance 272b may always perform this check in both online and outage conditions, if desired.

With respect to the UI resource cache, the second CWA instance 272*b* may store UI cache on the endpoint device 202 in order to allow users to subsequently load the second CWA instance 272*b* with visual representation of UI assets, namely: static assets including app code (JS, HTML, CSS, images); and dynamic assets including the resources (apps, desktops) the user is entitled to. This can be practically achieved by leveraging custom UI interception and caching techniques, e.g., based on the Axios library by Google, as opposed to simply relying on Progressive Web App (PWA) service workers. In one example PWA implementation, PWA and Service Workers are configured to cache static assets: app code (JS, HTML, CSS, images). Service workers are configured to a network-first-fallback-to-cache caching strategy, because it is desirable to load the latest version of the app as opposed to, for example, loading a previous stale app version from cache. This is desirable because the app in the cache might not be up-to-date with the latest app available online/remotely. For example, a Progressive Web App can be used even in offline conditions (relying on data from the cache). However, it is possible the app has been fixed/improved on the corresponding web site, and therefore the locally cached app might not include a particular fix or improvement. Also, custom in-app caching may be performed for dynamic assets, e.g., the resources (apps, desktops) the user is entitled to access. A cache-first-fallback-to-network or cache-network-race caching strategy may be used for performance reasons.

In an example embodiment, a WorxBox library can be used to implement service workers and caching. An Axios library can be used to communicate to the WorxBox by virtue of the requests it makes. The Axios library is effectively an interceptor for HTTP/HTTPS requests, and can be used to implement in-app caching.

Caching by the second CWA instance 272*b* in a virtual session can be extended to understand different locations of assets, including local browser cache (DOM storage) on the first virtual delivery appliance 201*a* with the second CWA instance 272*b*, endpoint device 202 over a control virtual channel, and an optimization with local file share 280, as noted above. Also, in-app caching may be used for both static and dynamic assets. Furthermore, long-lived Auth Tokens (LL AuthT) may be used for front-end authentication, resource enumeration, CL requests and sync, etc. Polymorphic Auth Tokens (PAuthT) of different types may be used for SSOn to the virtual delivery appliances 201*a*, 201*b*. Similar to the CLs, LL AuthTs and PAuthTs can be stored on the endpoint device 202 (in addition to the first virtual delivery appliance 201*a* with the second CWA instance 272*b*) and are bound to the endpoint private/public key pair.

Figure 14:
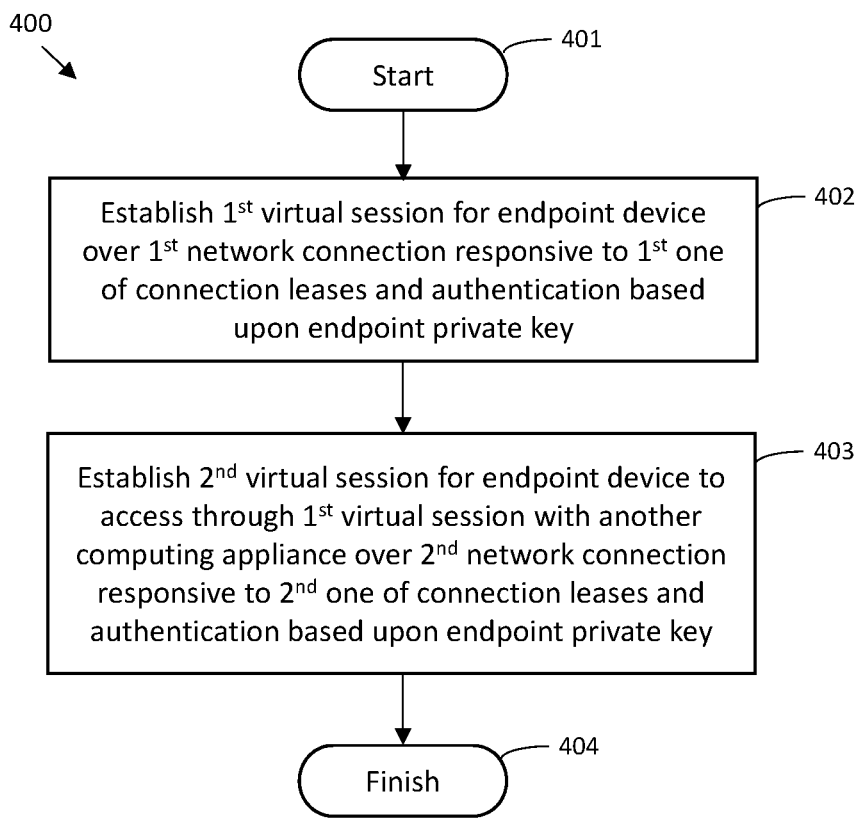
FIG. 14 is a flow diagram illustrating example method aspects associated with the system of FIG. 6.

A related method is now described with reference to the flow diagram 400 of FIG. 14. Beginning at Block 401, the method illustratively includes establishing, at a computing device (e.g., the first virtual delivery appliance 201*a*), a first virtual session for an endpoint device 202 over a first network connection 207*a*, at Block 402. The endpoint device 202 may have an endpoint public/private key pair associated therewith and may be configured to store a plurality of connection leases generated based upon the endpoint public key, as discussed above. The first virtual session may be established responsive to a first one of the connection leases and authentication based upon the endpoint private key. The method may further include establishing, at the computing device, a second virtual session for the endpoint device 202 to access through the first virtual session with another computing appliance (e.g., the second virtual delivery appliance 201*b*) over a second network connection 207*b* responsive to a second one of the connection leases and authentication based upon the endpoint private key, at Block 403, as further discussed above. The method of FIG. 14 illustratively concludes at Block 404.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing appliance comprising:
   a memory and a processor configured to cooperate with the memory to
   establish a first virtual session for an endpoint device over a first network connection, the endpoint device having an endpoint public/private key pair associated therewith and configured to store a plurality of connection leases generated based upon the endpoint public key, and the first virtual session being established responsive to a first one of the connection leases and authentication based upon the endpoint private key, and
   establish a second virtual session for the endpoint device to access through the first virtual session with another computing appliance over a second network connection responsive to a second one of the connection leases and authentication based upon the endpoint private key.

2. The computing appliance of claim 1 wherein the processor is further configured to establish a secure tunnel with the endpoint device via the first network connection, and authenticate the second connection lease based upon the endpoint private key via the secure tunnel.

3. The computing appliance of claim 2 wherein the processor authenticates the second connection lease by accessing the endpoint private key via a virtual channel over the secure tunnel.

4. The computing appliance of claim 2 wherein the processor authenticates the second connection lease by accessing the endpoint private key via a virtual smart card over the secure tunnel.

5. The computing appliance of claim 1 wherein the processor is further configured to perform background downloads of updates to the connection leases from a local file share.

6. The computing appliance of claim 5 wherein the processor is configured to store the updates to the connection leases in a memory and at the endpoint device.

7. The computing appliance of claim 1 wherein the processor is further configured receive a published resource identifier (ID) from the endpoint device corresponding to a virtual desktop being accessed by the endpoint device, and block launching of the virtual desktop associated with the published resource ID.

8. The computing appliance of claim 1 wherein the processor is further configured to cache the connection leases and endpoint public key in the memory.

9. The computing appliance of claim 1 wherein the processor is further configured to establish the first and second virtual sessions based upon a user interface (UI) cache associated with the endpoint device.

10. A method comprising:
    establishing, at a computing device, a first virtual session for an endpoint device over a first network connection, the endpoint device having an endpoint public/private key pair associated therewith and configured to store a plurality of connection leases generated based upon the endpoint public key, and the first virtual session being established responsive to a first one of the connection leases and authentication based upon the endpoint private key; and
    establishing, at the computing device, a second virtual session for the endpoint device to access through the first virtual session with another computing appliance over a second network connection responsive to a second one of the connection leases and authentication based upon the endpoint private key.

11. The method of claim 10 further comprising, at the computing device, establishing a secure tunnel with the endpoint device via the first network connection, and authenticating the second connection lease based upon the endpoint private key via the secure tunnel.

12. The method of claim 11 wherein authenticating comprises authenticating the second connection lease by accessing the endpoint private key via a virtual channel over the secure tunnel.

13. The method of claim 11 wherein authenticating comprises authenticating the second connection lease by accessing the endpoint private key via a virtual smart card over the secure tunnel.

14. The method of claim 10 further comprising, at the computing device, performing background downloads of updates to the connection leases from a local file share.

15. The method of claim 10 further comprising, at the computing device, receiving a published resource identifier (ID) from the endpoint device corresponding to a virtual desktop being accessed by the endpoint device, and blocking launching of the virtual desktop associated with the published resource ID.

16. A non-transitory computer-readable medium having computer executable instructions for causing a computing device to perform steps comprising:
    establishing a first virtual session for an endpoint device over a first network connection, the endpoint device having an endpoint public/private key pair associated therewith and configured to store a plurality of connection leases generated based upon the endpoint public key, and the first virtual session being established responsive to a first one of the connection leases and authentication based upon the endpoint private key; and
    establishing a second virtual session for the endpoint device to access through the first virtual session with another computing appliance over a second network connection responsive to a second one of the connection leases and authentication based upon the endpoint private key.

17. The non-transitory computer-readable medium of claim 16 further having computer-executable instructions for causing the computing device to perform steps comprising:
    establishing a secure tunnel with the endpoint device via the first network connection; and
    authenticating the second connection lease based upon the endpoint private key via the secure tunnel.

18. The non-transitory computer-readable medium of claim 17 wherein authenticating comprises authenticating the second connection lease by accessing the endpoint private key via a virtual channel over the secure tunnel.

19. The non-transitory computer-readable medium of claim 17 wherein authenticating comprises authenticating the second connection lease by accessing the endpoint private key via a virtual smart card over the secure tunnel.

20. The non-transitory computer-readable medium of claim 16 further having computer-executable instructions for causing the computing device to perform background downloads of updates to the connection leases from a local file share.

\* \* \* \* \*